United States Patent
Smith et al.

[11] 3,794,425
[45] Feb. 26, 1974

[54] SCANNING INFRARED SPECTROSCOPIC ANALYZER USING ROTATING VARIABLE FILTER

[75] Inventors: Vigo N. Smith, Houston, Tex.; Richard C. Bowers, Richmond, Calif.

[73] Assignee: Shell Oil Company, Houston, Tex.

[22] Filed: Aug. 22, 1972

[21] Appl. No.: 282,802

[52] U.S. Cl............... 356/51, 356/96, 356/188
[51] Int. Cl............... G01n 21/34, G01j 3/48
[58] Field of Search...... 356/51, 79, 89, 96, 97, 188

[56] References Cited
UNITED STATES PATENTS

| | | |
|---|---|---|
| 3,695,764 | 10/1972 | Delman................................. 356/51 |
| 3,437,411 | 4/1969 | Rudomanski et al................. 356/89 |
| 3,661,462 | 5/1972 | Natens................................. 356/51 |
| 3,435,209 | 3/1969 | Keahl................................... 356/51 |
| 3,696,247 | 10/1972 | McIntosh et al..................... 356/51 |
| 3,704,953 | 12/1972 | Carter et al......................... 356/96 |

Primary Examiner—Ronald L. Wibert
Assistant Examiner—V. P. McGraw
Attorney, Agent, or Firm—Theodore E. Bieber

[57] ABSTRACT

A fast spectroscopic analyzer wherein chopped infrared light is passed through a sample cell, a rotating variable filter and to a detector. The angular position of the filter corresponds to various wave lengths of light and is used to synchronize a recording system, recording signals of interest.

7 Claims, 3 Drawing Figures

3,794,425

SCANNING INFRARED SPECTROSCOPIC ANALYZER USING ROTATING VARIABLE FILTER

BACKGROUND OF THE INVENTION

The invention relates to an apparatus that is particularly adapted for fast spectroscopic analysis of plant or refinery streams for use in process control and in analyzing process dynamics.

DESCRIPTION OF THE PRIOR ART

Present day commercial infrared and ultraviolet analyzers for process control are usually capable of measuring only a single component in a process stream. Although these non-dispersive analyzers are generally highly reliable and give rapid response to composition changes, their application is limited to relatively simple process streams.

Analyzing of complex streams in the past has been accomplished using gas chromatography but analyzers of this type require more attention to their operation and also require more maintenance. An even further drawback of gas chromatographs is that they are relatively slow, requiring 5 to 20 minutes per analysis cycle. In process streams where conditions are rapidly changing, such a time lag is undesirable, particularly during a plant stream upset.

Commercial infrared spectrophotometers now available record the desired data in a form that requires this data be plotted graphically in order to determine the make-up or composition of the stream being analyzed making such an instrument cumbersome for analyzing process stream dynamics or for use in process stream control where more than one component of a stream is being controlled or recorded.

SUMMARY OF THE INVENTION

The present invention advantageously solves these problems by incorporating a digital computer into the system for controlling the instrument and storing of the data pertaining to the stream make-up.

The incorporation of a digital computer into the system allows the desired data to be stored for later retrieval and analysis. Use of a computer allows the spectrophotometer to step through a selected sequence of analytical frequencies, depending upon the stream being analyzed, and then compute the analysis using a predetermined calibration matrix stored in the computer.

An even further advantage of one embodiment of the present invention is in the method of wave length determination by using a pulse counting technique allowing accurate determination of the wave length being passed by a circular variable filter.

DESCRIPTION OF THE DRAWINGS

The nature of the present invention will be more fully appreciated with reference to the drawings in which.

DESCRIPTION OF A PREFERRED EMBODIMENT

Figure 1:
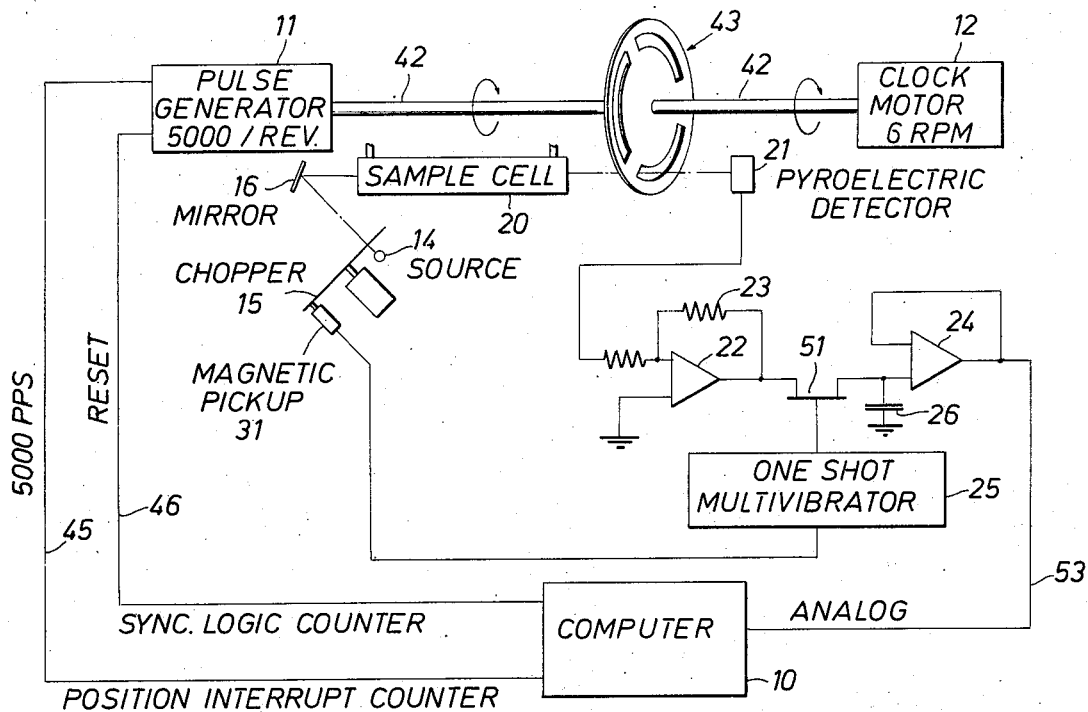
FIG. 1 is a schematic illustration of the basic components comprising the one embodiment of the spectroscopic analyzer.

Referring to FIG. 1, the major components of a spectroscopic analyzer are shown in which radiation from an infrared light source 14 is being chopped by a chopper 15 at a predetermined constant frequency (540$H_z$ in this case). The chopped light is then reflected by a toroidal mirror 16 and passed through a sample cell 20. After passing through the sample cell 20, the light then passes through a circular variable filter (CVF) 13. The CVF 13 is mechanically coupled to a synchronous clock motor 12 by a shaft 41, rotating at a constant speed, say one revolution every 10 seconds. The CVF 13 is in turn mechanically coupled to a pulse generator by means of a second shaft 42. The pulse generator 11, by being mechanically coupled to the CVF 13, generates position pulses corresponding to the angular position of the CVF 13. For example, 5,000 position pulses could be generated for every one revolution of the CVF 13. The CVF 13 is a circular disc and has three separate segments of circular variable filters covering the wavelength range of 2.5 to 14.5 microns in the infrared with a resolution of 1.5 to 2 percent. It is of standard design and is manufactured by Optical Coating Laboratories, Santa Rosa, Calif. The wave length of radiation passed by the relatively narrow segment of the filter varies as a function of the angle of rotation. By mechanically coupling the pulse generator to the CVF 13, the wave length being passed by the CVF can be determined within 1 part in 3,400 since the filters do not cover the full 360° of rotation.

In order to synchronize the operation of the analyzer with a digital computer 10, a synchronizing pulse signal (one pulse per revolution) is connected byway of line 46 to the logic level input of the digital computer 10. A position pulse signal from the pulse generator 11 is transmitted to an interrupt counter in the digital computer 10 by line 45.

A typical operation wherein the synchronizing pulse, interrupt pulse, and the digital computer are interrelated are:

1. Computer checks logic input for appearance of synchronizing pulse;
2. When synchronizing pulse appears, the interrupt counter is set to zero and started;
3. The computer checks the contents of the counter continuously until a count corresponding to a preselected analytical wave length is reached;
4. When the corresponding count is reached, the analog input from the short time-constant rectifier and filter 24 is read by the computer and stored for later retrieval;
5. Observation of the counter by the computer 10 continues until the next desired analytical wave length as determined by the counter is reached;
6. When all desired wave lengths have een observed, the computer again checks the contents of the logic input for appearance of the synchronizing pulse and the entire cycle is repeated. All data required for an analysis are collected in one revolution of the CVF (e.g., in 10 seconds).

After a predetermined number of cycles have been completed, the computer will calculate the analysis for each cycle, average if desired, and print out the desired information or the output may be fed to a control circuit to readjust the process stream make-up.

The light after passing through the CVF 12 travels to an infrared detector 21, which is preferably a triglycine sulfate pyroelectric detector. A detector of this type is preferred for its rapid response. The signal from the detector 21 is then amplified by a tuned amplifier 23 and then rectified using a short time-constant rectifier and filter consisting of FET switch 51, capacitor 26, and DC amplifier 24. The DC signal from amplifier 24 is fed to the computer 10 by means of line 53. A conventional one shot multivibrator 25 is driven by a magnetic pickup 31 that is synchronized with chopper 15 so that the FET switch 51 closes and conducts only when the AC signal from amplifier 23 is at its peak amplitude. Thus, capacitor 26 is charged to the peak AC voltage, and is updated on each cycle (or half cycle) of the chopper frequency.

Standardization of the analyzer is accomplished by flushing the sample cell 20 with a non-absorbing gas such as nitrogen and running through one or more cycles to store as many points in the background spectrum as may be needed in the analysis. During this standardization mode the computer stores a set of signals corresponding to 100 percent transmission (nitrogen) and 0% transmission (the opaque sections of the CVF between each of the filters). One cycle is sufficient to store the required background data, but usually a number of cycles are averaged to improve accuracy.

The actual component concentrations $C_i$ in the analysis mode of operation of the spectroscopic device are calculated using the approach outlined hereinbelow.

For monochromatic radiation of a frequency, $n_i$, the transmission of a gas sample may be expressed by $$T_i = \text{EXP} (-R_i L) \quad (1)$$

where $R_i$ = absorbance of the sample mixture at frequency $n_i$, and
$L$ = sample cell path length Equation (1) is valid only for monochromatic radiation, and the true response may depart significantly from the exponential in some cases because of the finite spectral band of radiation measured in the spectrophotometer. However, these discrepancies are usually small and can be taken into account readily in the computation.

After the values of $T_i$ have been computed from the measured voltages, we can compute the absorbance, $R_i$, from the following equation, derived from Equation (1):

$$R_i = 1/L \ln (1/T_i) \quad (2)$$

Since the absorbances are directly proportional to the molecular density in the sample cell, changes in pressure and temperature will affect the analysis, and corrections can be put into the computation, if desired. However, the sample cell 20 is vented to the atmosphere, and changes in atmospheric pressure as great as ± 2 percent are unusual. Similarly, the sample cell temperature can be easily maintained within a range of ± 2 percent absolute. Therefore, pressure and temperature variations usually may be neglected in the computation.

The effective absorbance, $R_i$, at frequency $n_i$ is a linear combination of the individual absorption coefficients of all components present in the sample. Thus, N equations of the form below can be written:

$$R_i = \sum_{j=1}^{M} A_{ij} C_j \quad (3)$$

where
$A_{ij}$ = absorption coefficient of pure component $j$ at frequency $n_i$
$C_j$ = mole fraction of component $j$
$M$ = number of components in the mixture The coefficient matrix elements, $A_{ij}$, are predetermined using mixtures of pure gases in nitrogen as described in the following section. Only one analytical frequency for each component is used (i.e., $N = M$). The coefficient matrix is then inverted, using any available digital computer to obtain a calibration matrix $B = A^{-1}$, which is loaded into the computer memory and used repeatedly in computation. A set of N equations is obtained for computing composition of the sample by multiplying the set of equations (3) by the inverted matrix; thus $$C_i = \sum_{j=1}^{N} B_{ij} R_j \quad (4)$$

To summarize briefly, after the analyzer has been standardized, the analysis is accomplished in the following steps:

1. Signal voltages are read, averaged and stored at N analytical frequencies;
2. N values of transmission are computed;
3. N corresponding values of absorbance are computed using Equation (2);
4. Mole fractions (or percentages) are computed for the N components using Equation (4); and
5. Results are stored or printed out and the entire cycle is repeated.

Although a straight-forward solution of simultaneous equations has been used in the analytical procedure, it would be possible to improve accuracy by taking redundant data (i.e., make $N > M$) and then using one of a variety of available techniques (e.g., linear programming) to compute the best set of concentrations to fit the data.

Before the analyzer can be tuned and calibrated for a particular application, the infrared absorption spectra of all components present must be reviewed carefully to select the analytical frequencies and to decide on a compromise sample cell length. The computer can then be programmed for the desired frequencies to determine the absorption coefficients using mixtures of each pure component in nitrogen.

For best accuracy it is preferable to find a frequency for each component where that component absorbs and all others are transparent. If such frequencies could be found, then $B_{ij} = 0$ except when $i = j$, and Equation (4) would reduce to $C_i = B_{ii} R_i = R_i / A_{ii}$. In general, however, there is significant overlap of the spectra, and a selection of a set of frequencies that will make the off-diagonal matrix elements, $A_{ij}$, as small as possible relative to the diagonal elements, $A_{ii}$ must be made. This selection must also take into account the practicable sample cell path length that can be used. In the present invention cell lengths up to 20 cm are used. The lower limit for a good, practical flow cell is about 1 mm, although thinner cells can be used, if properly designed, and if the nature of the sample permits. The ideal cell length for maximum response is that length for which the transmission is $1/e$ (~37 percent) at the normal stream composition. In general it is not possible to find a set of frequencies such that this rule is satisfied at all frequencies. Therefore, a cell length must be chosen, within the physical limitations, that will most nearly approach the ideal for the components of major interest.

In principle, the absorption coefficients ($A_{ij}$) could be determined by filling the sample cell with each of the pure components in turn and measuring the transmission at the N selected frequencies. In practice it is necessary to dilute the calibrating gases with nitrogen to get transmission readings within the acceptable range. Furthermore, it is preferable to make the measurements at a number of known concentrations in nitrogen to determine whether the absorbance is linear with concentration. Calibrating mixtures are made by flow mixing using a special manifold designed for the purpose. Approximate compositions can be determined by rotameter readings, but for accurate results a soap-film meter and stop watch are used. Calibrating mixtures of the vapors of volatile liquids, such as pentanes, can be made by saturating a nitrogen stream with the vapor at a known temperature. A simple bubbler immersed in a constant-temperature bath serves as the saturator, and composition is computed from known vapor pressure data for the given compound.

When only one absorbing component is present in the sample cell, Equation (3) reduces to $R_i = A_{ij}C_j$ and the N absorption coefficients for component $j$ are given by N equations $$A_{ij} = R_i/C_j$$

(5)

If the transmissions $T_i$, are determined at a number of concentrations and the absorbances, $R_i$ are computed using Equation (2), and a plot of $R_i$ as a function of concentration, $C_j$, is made for each frequency, the $A_{ij}$'s can be obtained from the slopes of the plots.

After the coefficient matrix has been determined using the individual components, the matrix is then inverted and the calibration is tested using known multicomponent mixtures. This test can be done using flow-blended mixtures or analyzed standard samples. Usually it is found that errors occur in the minor components, apparently because of inaccuracies in the determination of the cross-sensitivity coefficients of major components. These errors can be eliminated by minor adjustments of the calibration matrix elements, $B_{ij}$, to make computed results agree with a known composition.

Two different applications of the present invention have been experimentally tested in connection with process control studies. One such application was in the analysis of rectified absorber (RA) dry gas composition. The following table illustrates the composition of untreated RA dry gas.

TABLE 1 — COMPOSITION OF UNTREATED RA DRYGAS

| Compound | Weight % | Mole % | Frequency, cm$^{-1}$ |
| --- | --- | --- | --- |
| Hydrogen | 11.2 | 65.3 | — |
| Air | 2.2 | 0.9 | — |
| Hydrogen Sulfide | 19.5 | 6.7 | — |
| Methane | 18.9 | 13.8 | 1247 |
| Ethane | 13.8 | 5.4 | 837 |
| Propane | 16.2 | 4.3 | 1067 |
| Isobutane | 13.9 | 2.8 | 1176 |
| Normal Butane | 2.5 | 0.5 | 970 |
| Isopentane | 1.8 | 0.3 | 1021 |

The analysis was confined to the hydrocarbon components only. Hydrogen and air are completely transparent in the infrared and hydrogen sulfide is a very weak absorber (in the 1,300 cm$^{-1}$ region). The analytical frequencies selected are listed in the last column of Table 1. The results of the analysis using the infrared spectroscopic analyzer are given in Table 2.

TABLE 2 — RA DRYGAS

| Compound | Untreated Mole, % | | Treated Mole, % | |
| --- | --- | --- | --- | --- |
| | Mass. Spec. | IR Analyzer | Mass. Spec. | IR Analyzer |
| $H_2$ | 61 | — | 68.3 | — |
| $CH_4$ | 18.8 | 20.7 | 18.5 | 19.4 |
| $H_2O$ | 1.0 | — | 0.1 | — |
| $C_2H_4$ | 0.2 | — | — | — |
| $N_2$ | 2.2 | — | 1.5 | — |
| $C_2H_6$ | 5.7 | 5.9 | 4.8 | 4.9 |
| $O_2$ | 0.2 | — | — | — |
| $H_2S$ | 3.0 | — | — | — |
| $C_3H_8$ | 4.1 | 5.6 | 3.2 | 4.8 |
| Acetone | 0.2 | — | — | — |
| $I-C_4$ | 3.0 | 2.6 | 2.0 | 2.1 |
| $N-C_4$ | — | 1.4 | 0.6 | 1.3 |
| $I-C_5$ | — | 1.7 | — | 1.3 |

The second application was in the analysis of depropanizer bottoms. The composition of the stream makeup and frequencies selected for each component is given in Table 3.

TABLE 3 – COMPOSITION OF DEPROPANIZER BOTTOMS

| Compound | Mole, % | Frequency-cm$^{-1}$ |
| --- | --- | --- |
| Propane | 3.5 | 1055 |
| n-Butane | 46 | 1284 |
| i-Butane | 45 | 800 |
| n-Pentane | 0.1 | 870 |
| i-Pentane | 5.4 | 1021 |

The following table illustrates the results of a 10-hour test run of depropanizer bottoms. The tabulated values are hourly averages of 25 separate analyses and the standard deviation for each of the five components.

Figure 2:
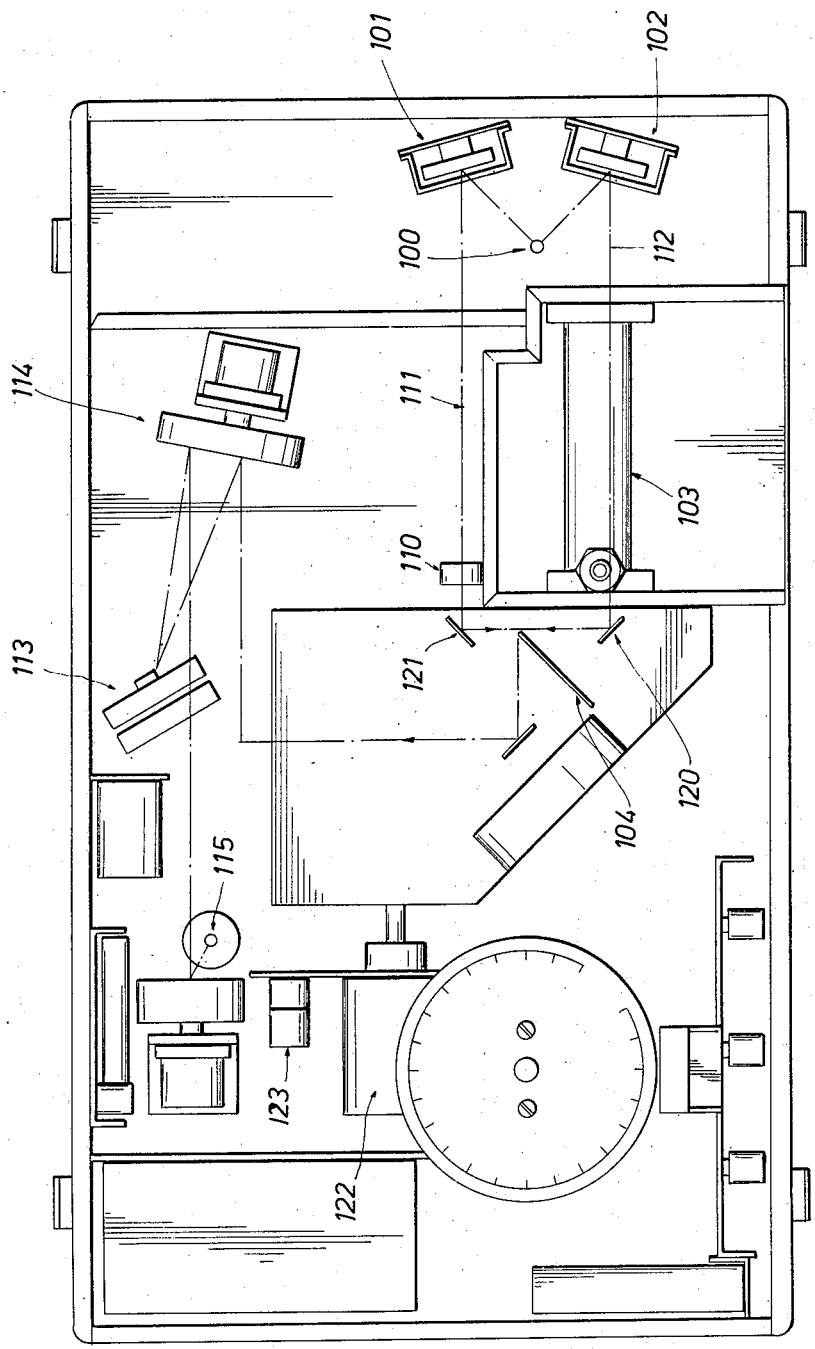
FIG. 2 is a plan view of a second embodiment of the spectroscopic analyzer.

A second embodiment of the present invention is shown in FIG. 2. A commercially available spectrophotometer (Perkin-Elmer Model 257) was substantially modified to interface with the digital computer 10 as described with reference to FIG. 1. In this embodiment a dual beam system is used with a single infrared source 100. A toroid mirror 102 reflects the light beam 112 through a sample cell 103 to a mirror 120. A toroid mirror 101 in turn reflects a reference beam 111 to a mirror 121 that is similar to mirror 120. A chopper 104 consisting of a sector mirror intercepts the beams 112 and 111 to alternately direct each beam to the diffraction grating 113 by means of paraboloid mirror 114. The diffraction grating 113 is the equivalent to the CVF 13 shown in FIG. 1.

Rather than scan continuously through the entire

TABLE 4.—SATURATES GAS PLANT-DEPROPANIZER BOTTOMS

Figure 3:
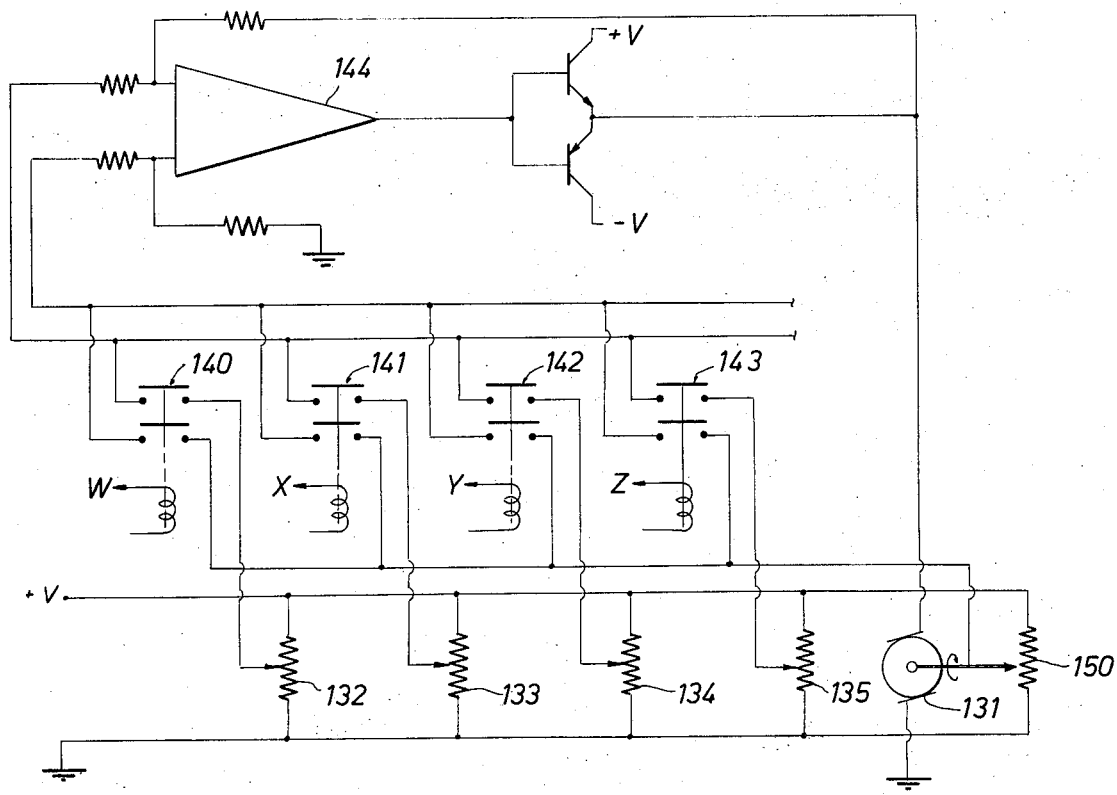
FIG. 3 is a schematic showing the means by which the diffraction grating of the second embodiment is sequentially positioned by the digital computer.

| | $C_3$ | | $n\text{-}C_4$ | | $i\text{-}C_4$ | | $n\text{-}C_5$ | | $i\text{-}C_5$ | |
|---|---|---|---|---|---|---|---|---|---|---|
| Hr. | Avg., percent m. | Std. dev. | Avg., percent m. | Std. dev. | Avg., percent m. | Std. dev. | Avg., percent m. | Std. dev. | Avg., percent m. | Std. dev. |
| 1 | 4.038 | ±0.104 | 28.488 | ±0.211 | 62.788 | ±0.677 | 0.686 | ±0.060 | 4.416 | ±0.027 |
| 2 | 4.056 | ±0.074 | 28.571 | ±0.242 | 62.832 | ±0.576 | 0.717 | ±0.053 | 4.396 | ±0.046 |
| 3 | 4.364 | ±0.252 | 28.047 | ±0.618 | 64.199 | ±0.965 | 0.728 | ±0.058 | 4.213 | ±0.349 |
| 4 | 4.464 | ±0.050 | 28.025 | ±0.229 | 64.438 | ±0.531 | 0.690 | ±0.053 | 4.524 | ±0.073 |
| 5 | 4.428 | ±0.067 | 27.998 | ±0.163 | 64.159 | ±0.508 | 0.621 | ±0.072 | 4.550 | ±0.048 |
| 6 | 4.465 | ±0.053 | 27.655 | ±0.305 | 64.851 | ±0.551 | 0.616 | ±0.058 | 4.569 | ±0.070 |
| 7 | 4.513 | ±0.045 | 27.595 | ±0.251 | 65.063 | ±0.523 | 0.689 | ±0.073 | 4.580 | ±0.059 |
| 8 | 4.439 | ±0.056 | 27.526 | ±0.230 | 65.214 | ±0.441 | 0.747 | ±0.072 | 4.560 | ±0.063 |
| 9 | 4.456 | ±0.058 | 27.256 | ±0.333 | 65.608 | ±0.721 | 0.779 | ±0.080 | 4.604 | ±0.063 |
| 10 | 4.465 | ±0.063 | 27.476 | ±0.214 | 65.567 | ±0.523 | 0.812 | ±0.059 | 4.590 | ±0.047 | spectrum, a permanent magnet servo motor 131 (FIG. 3) is incorporated in the main frequency drive to sequentially tune the diffraction grating 113 to each preselected frequency programmed in the computer. Tuning is accomplished by means of a plurality of potentiometers 132, 133, 134 and 135. These potentiometers are preset to tune the grating 113 to the desired analytical frequencies and relays 140–143 connect one potentiometer at a time to an operational amplifier 144. The same relay also connects a follow-up potentiometer 150 to the amplifier 144. Consequently, if there is any difference in potential between the set point potentiometer (133–135) and the follow-up potentiometer 150 the servo motor 131 turns to reduce the potential, thereby accurately tuning the grating 113 to the desired analytical wave length. The relay lines W, X, Y, and Z (FIG. 3) are sequentially energized by a digital computer as described with reference to FIG. 1. Any number of preset frequencies can be utilized in process stream analysis by the addition of one potentiometer and one relay for each analytical frequency.

The light beam after leaving the diffraction grating is intercepted by a thermocouple detector 115. An optical wedge 110 is inserted in the reference beam 111 by an optical servo motor 122 to correct for the absorption of the sample in the measuring beam 112. The position of the servo motor 122 is a readout for the analytical absorption at the particular frequency that the grating 113 has been tuned to as hereinbefore described. A re-transmitting slide wire 123 transmits this voltage from servo motor 122 to the computer giving an analog input to the computer, the analog input being converted to digital by an analog to digital converter in the computer.

As can be readily seen from the description of the previous embodiments of the present invention, one utilizes a single beam configuration and a continuous rotating circular variable filter whereas the other utilizes a double beam configuration and is stepped through various analytical frequencies. A reference beam could also easily be incorporated in the first embodiment using the circular variable filter by merely adding appropriate mirrors and combining both beams after the sample cell and before the pyroelectric detector. The embodiment illustrated in FIGS. 2 and 3 would be preferred where high spectral resolution (on the order of 0.1 percent or better) is desired.

We claim as our invention:

1. A spectroscopic analyzer for analysis of process streams, said analyzer comprising:
    an infrared light source;
    a sample cell having inlet and outlet openings for passage of a sample therethrough;
    means for directing infrared light from said infrared light source through said sample cell, said detector having an output signal proportional to the intensity of light intercepted by said detector;
    a rotatable circular variable filter positioned between said sample cell and said detector, the wavelength being passed by said filter being dependent upon the angular position of said filter;
    a synchronous motor mechanically coupled to rotate said circular variable filter;
    a pulse generator mechanically coupled to said circular variable filter, said generator generating pulses corresponding to the angular position of said filter, said generator further generating a synchronization pulse for each complete revolution of said filter, said pulses and said synchronization pulse being transmitted to a digital computer;
    means for amplifying and subsequently rectifying said output signal from said detector; and
    a digital computer, said computer being coupled to said pulse generator and programmed to control the preselected wavelengths at which data is taken, said computer being further programmed to read and store said rectified signal and print out concentrations of components having absorption at said preselected wavelengths.

2. The analyzer of claim 1 wherein said digital computer is provided with a position interrupt counter, said counter being adapted to sum pulses generated by said generator, said computer being programmed to continuously monitor said counter, said computer being further programmed to reset said counter when said synchronization pulse is generated by said generator.

3. The analyzer of claim 1 wherein said pulse generator generates 5,000 position pulses per revolution of said circular variable filter.

4. The analyzer of claim 1 further including:
    a reference infrared light beam;
    an optical wedge;
    an optical servo motor connected to said optical wedge and adapted to insert said optical wedge in said reference beam to correct for absorption of said sample by infrared light passing therethrough; and
    a re-transmitting slide wire suitably connected to said optical servo motor, said re-transmitting slide wire transmitting a voltage to the digital computer corresponding to analytical absorption at each preselected analytical frequency.

5. A method of continuously analyzing process streams having at least one component of interest using a chopped infrared light source and infrared detector, said method comprising the steps of:
    rotating a circular variable filter at a constant speed;
    generating a plurality of pulses corresponding to the angular position of said circular variable filter;
    continuously counting said generated pulses by means of an interrupt counter until a count corresponding to a predetermined angular position of said circular variable filter is reached; and recording a signal generated by said infrared detector, said signal being related to a wavelength of light being passed by said circular variable filter.

6. The method of claim 5 further including the step of generating a synchronizing pulse, said synchronizing pulse resetting said interrupt counter to zero whereby said analyzing process is repeated.

7. The method of claim 5 wherein said signal is recorded by a digital computer and subsequently analyzed using a predetermined calibration matrix.

* * * * *